(12) United States Patent
Riehl

(10) Patent No.: US 7,388,356 B2
(45) Date of Patent: Jun. 17, 2008

(54) SYSTEM AND METHOD FOR PROVIDING VOLTAGE REGULATION IN A MULTI-VOLTAGE POWER SYSTEM

(75) Inventor: Patrick Riehl, Lawrence, MA (US)

(73) Assignee: Mediatek, Inc., Hsin-Chu (TW)

( * ) Notice: Subject to any disclaimer, the term of this patent is extended or adjusted under 35 U.S.C. 154(b) by 82 days.

(21) Appl. No.: 11/269,468

(22) Filed: Nov. 8, 2005

(65) Prior Publication Data

US 2006/0113977 A1   Jun. 1, 2006

Related U.S. Application Data

(60) Provisional application No. 60/627,647, filed on Nov. 12, 2004.

(51) Int. Cl.
*G05F 1/56* (2006.01)
(52) U.S. Cl. .................................... 323/281; 323/349
(58) Field of Classification Search .............. 323/281, 323/282, 313, 314, 349
See application file for complete search history.

(56) References Cited

U.S. PATENT DOCUMENTS

| | | | | |
|---|---|---|---|---|
| 4,244,050 A | | 1/1981 | Weber et al. | 371/66 |
| 4,716,354 A | | 12/1987 | Hacker | 320/39 |
| 5,177,431 A | * | 1/1993 | Smith et al. | 323/349 |
| 5,519,309 A | * | 5/1996 | Smith | 323/316 |
| 5,578,916 A | | 11/1996 | Muterspaugh | 323/267 |
| 5,926,384 A | * | 7/1999 | Jochum et al. | 363/56.05 |
| 5,955,870 A | | 9/1999 | Nair | 323/273 |
| 5,963,439 A | | 10/1999 | Wuidart et al. | 363/46 |
| 6,057,607 A | | 5/2000 | Rader, III et al. | 307/11 |
| 6,081,105 A | | 6/2000 | Nair | 323/273 |
| 6,114,843 A | * | 9/2000 | Olah | 323/280 |
| 6,366,070 B1 | | 4/2002 | Cooke et al. | 323/284 |
| 6,380,720 B1 | | 4/2002 | Cain et al. | 323/268 |
| 6,650,093 B1 | | 11/2003 | Baldwin et al. | 323/224 |
| 6,677,734 B2 | | 1/2004 | Rothleitner et al. | 323/259 |
| 6,713,995 B2 | | 3/2004 | Chen | 323/284 |
| 6,909,320 B2 | | 6/2005 | Chan et al. | 327/541 |
| 6,927,558 B2 | * | 8/2005 | Kawaguchi et al. | 323/313 |
| 6,957,278 B1 | * | 10/2005 | Gallagher et al. | 710/1 |
| 6,969,981 B1 | * | 11/2005 | Fairbanks et al. | 323/299 |
| 2003/0076077 A1 | * | 4/2003 | Messager | 323/281 |

FOREIGN PATENT DOCUMENTS

EP   0893876   1/1999

* cited by examiner

*Primary Examiner*—Jeffrey L Sterrett
(74) *Attorney, Agent, or Firm*—Gauthier & Connors LLP

(57) ABSTRACT

A voltage regulator system is disclosed for use in selectively regulating a voltage source at a first output voltage potential and a second output voltage potential. The voltage regulator system includes a reference unit, a filter unit and a current source unit. The reference unit is for receiving a voltage reference input signal that is representative of a request for an output reference voltage signal to change. The filter unit is for providing a change in the output voltage over a predetermined period of time. The current source unit is for providing one of a positive or negative current source to an output node at which the output reference voltage is provided.

17 Claims, 3 Drawing Sheets

SYSTEM AND METHOD FOR PROVIDING VOLTAGE REGULATION IN A MULTI-VOLTAGE POWER SYSTEM

PRIORITY

This application claims priority to U.S. Provisional Patent Application Ser. No. 60/627,647 filed Nov. 12, 2004.

BACKGROUND OF THE INVENTION

This invention related generally to voltage regulators, and relates in particular to voltage regulators for use in systems that employ multiple voltage levels.

In certain electronic system such as digital signal processing systems that run on battery power, it is desirable to permit the power supply to provide full power during normal operation, yet provide a reduced power level when the circuit is in an idle state.

Dual power supplies may provide both a high voltage (e.g., 1.5 volts) and low voltage (e.g., 0.9 volts) at all times, and may provide switching between the voltage sources for operation of the system as required. Such an approach, however, may not be energy efficient as it must always provide both voltage potentials as well as the required current.

Another approach may involve changing the output voltage of the power supply responsive to the power needs of the system during operation. This approach, however, may result in power surges or spikes when the change occurs. Moreover, many power supplies include a capacitor at the output stage, and changing the output voltage may require time for the capacitor to change its charge accordingly, particularly when changing from the high to the lower output voltage.

There is a need, therefore, for a more efficient and economical voltage regulator for use in a multi-voltage power supply system.

SUMMARY OF THE INVENTION

The invention provides a voltage regulator system for use in selectively regulating a voltage source at a first output voltage potential and a second output voltage potential in accordance with an embodiment. The voltage regulator system includes a reference unit, a filter unit and a current source unit. The reference unit is for receiving a voltage reference input signal that is representative of a request for an output reference voltage signal to change. The filter unit is for providing a change in the output voltage over a predetermined period of time. The current source unit is for providing one of a positive or negative current source to an output node at which the output reference voltage is provided.

In accordance with another embodiment, the invention provides a voltage regulator system that includes a reference unit, a switch unit and a current source unit. The reference unit is for receiving a voltage reference input signal that is representative of a request for an output reference voltage signal to change, and for receiving an output reference voltage at each of a plurality of comparators. The switch unit is for receiving outputs of the comparators and for providing that a switch coupling the voltage reference input signal to an output capacitor is opened in the event that a significant difference exists between the voltage reference input signal and the output reference voltage. The current source unit is for providing one of a positive or negative current source to an output node at which the output reference voltage is provided.

In accordance with a further embodiment, the reference unit is for receiving a voltage reference input signal that is representative of a request for an output reference voltage signal to change, and for receiving an output reference voltage at each of a plurality of comparators. The switch unit is for receiving outputs of said comparators and for providing that a switch coupling the voltage reference input signal to an output capacitor is opened in the event that a significant difference exists between the voltage reference input signal and the output reference voltage. The current source unit is for providing one of a positive or negative current source to the output capacitor and an output node at which the output reference voltage is provided responsive to outputs of the comparators of the reference unit.

BRIEF DESCRIPTION OF THE DRAWINGS

The following description may be further understood with reference to the accompanying drawings in which.

The drawings are shown for illustrative purposes only.

DETAILED DESCRIPTION OF THE ILLUSTRATED EMBODIMENTS

Figure 1:
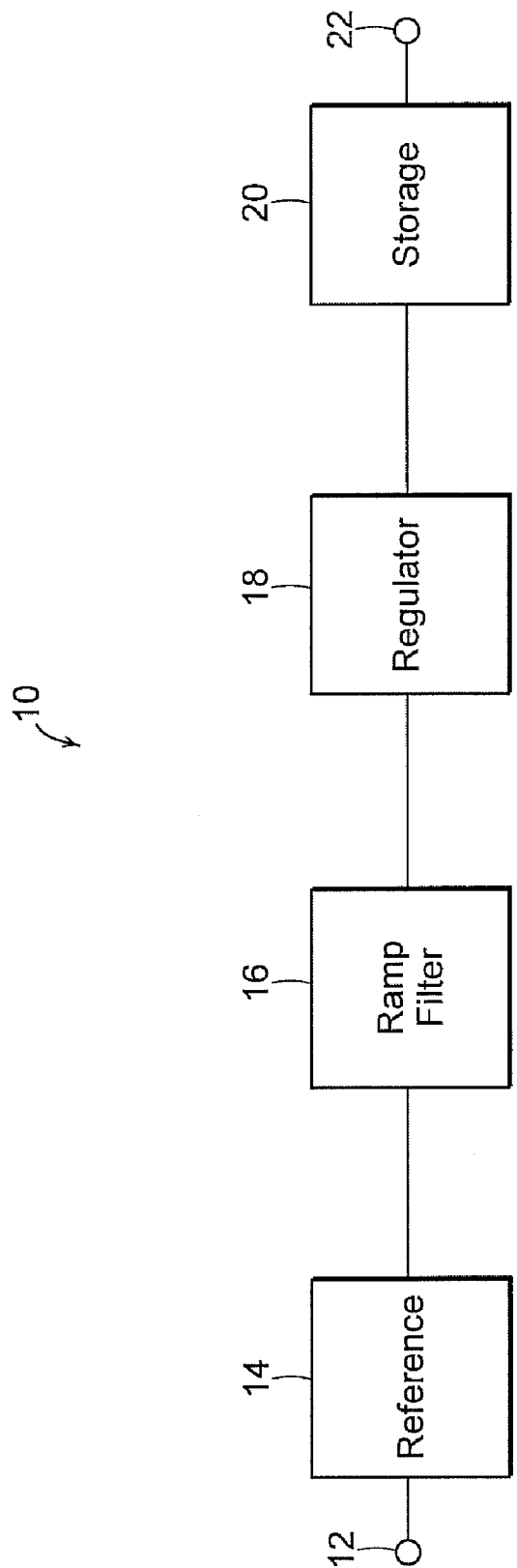
FIG. 1 shows an illustrative diagrammatic functional view of multi-voltage level regulator system in accordance with an embodiment of the invention.

FIG. 1 shows a functional view of the elements of a regulator system 10 in accordance with an embodiment of the invention. The system 10 itself provides the input to the switching regulator of the multiple voltage signal processing system.

The system 10 receives via an input node 12 a reference voltage (e.g., 0.9 volts or 1.5 volts) that the output is desired to provide as a power supply voltage. A reference unit 14 determines whether the output voltage needs to change. If so, a ramp filter unit 16 causes the change in voltage to occur over a short period of time (i.e., via a ramp) so that the change is spread by the voltage regulator 18 over a period of time to avoid a spike. A storage unit 20 (such as a capacitor) facilitates providing a steady output power supply to an output node 22.

Figure 2:
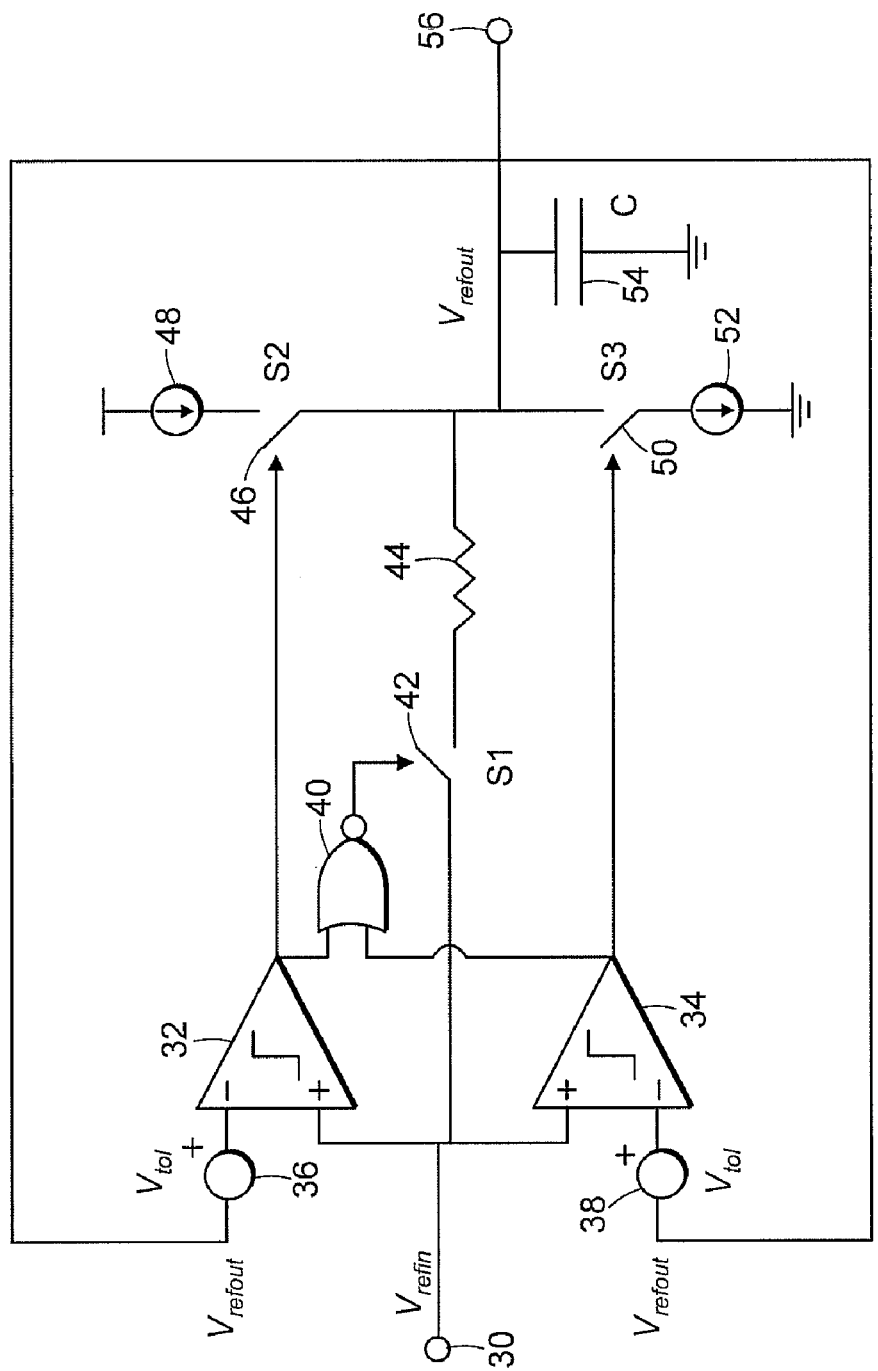
FIG. 2 shows an illustrative diagrammatic view of a circuit for performing the multi-voltage level regulation function of FIG. 1.

FIG. 2 shows a circuit for performing the functions discussed above with reference to FIG. 1. When the switching regulator powers up or is required to change its output voltage during operation of the signal processing system, large transient currents may result if the reference voltage is changed too abruptly. In the circuit shown in FIG. 2, the reference voltage is received at node 30 and is input to the positive inputs of each of two comparators 32 and 34. The negative inputs of the comparators 32 and 34 are coupled via voltage tolerance units 36 and 38 to the output of the circuit. The output of each comparator is coupled to an input of an inverted OR gate 40 (NOR gate), which drives a switch 42. The output of the comparator 32 is also coupled to a switch 46, and the output of the comparator 34 is also coupled to a switch 50.

When the two voltages ($V_{refin}$ and $V_{refout}$) are within tolerance of each other (e.g., within about 25 mV), then the switch 42 closes to connect the input voltage through a resistor 44 to a capacitor 54 and thereby provide the output power voltage at node 56. If the reference voltage ($V_{refin}$) is abruptly increased, switch 42 opens and switch 46 closes. This will cause a current to be integrated on the capacitor 54 via source 48 to linearly increase the output voltage until it is within the tolerance voltage. The switch 46 will then open again and switch 42 will close. If the reference voltage ($V_{refin}$) is abruptly decreased, switch 42 will open and switch 50 will close. This will cause a negative current to be integrated on the capacitor 54 via source 52 to linearly increase the output voltage until it is within the tolerance voltage. A negative ramp will appear on the output reference.

Figure 3:
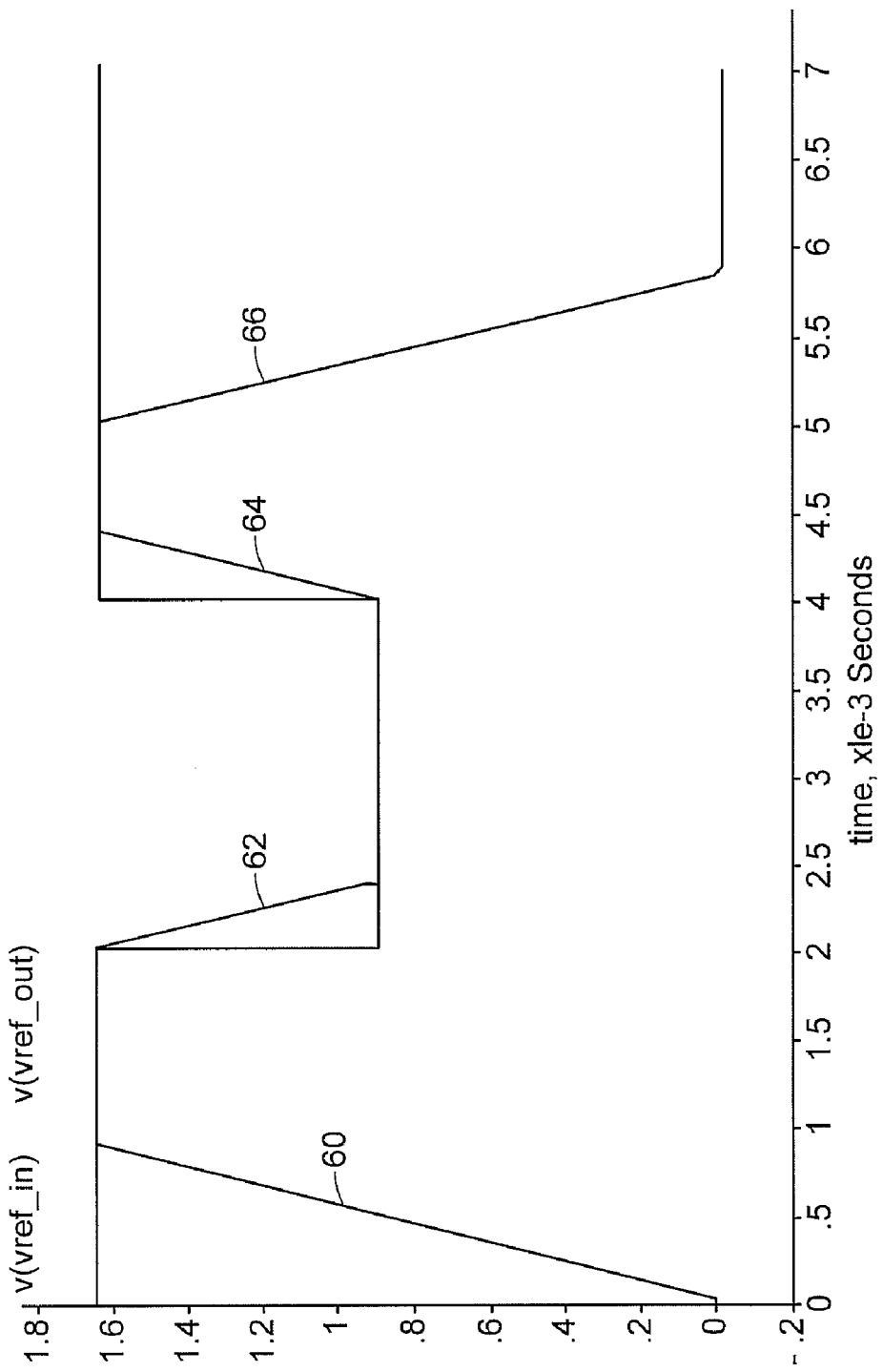
FIG. 3 shows an illustrative diagrammatic graphic representation of an output voltage over time for a voltage regulator system in accordance with an embodiment of the invention.

As shown in FIG. 3, the output voltage may ramp up when the circuit is initially turned on as indicated at 60. When the required voltage drops, the output voltage may ramp down as indicated at 62, and then the required voltage increases, the output voltage may ramp up as indicated at 64. Finally, the output voltage may ramp down as shown at 66 when the circuit is turned off.

Those skilled in the art will appreciate that numerous modifications and variations may be made to the above disclosed embodiments without departing from the spirit and scope of the invention.

What is claimed is:

1. A voltage regulator system for use in selectively regulating a voltage source at a first output voltage potential and a second output voltage potential, said voltage regulator system comprising:
    reference means for receiving a voltage reference input signal that is representative of a request for an output reference voltage signal to change from the first output voltage potential to the second output voltage potential;
    filter means for providing a change in the output voltage over a predetermined period of time; and
    current source means for providing one of a positive or negative current source to an output node at which the output reference voltage is provided.

2. The voltage regulator system as claimed in claim 1, wherein said reference means includes a plurality of comparators.

3. The voltage regulator system as claimed in claim 2, wherein said reference means includes a plurality of voltage tolerance units.

4. The voltage regulator system as claimed in claim 1, wherein said reference means includes an OR gate.

5. The voltage regulator system as claimed in claim 4, wherein said OR gate is an inverting OR gate.

6. The voltage regulator system as claimed in claim 1, wherein said system includes an output capacitor, and said current source means provides one of the positive or negative current source to the output capacitor.

7. A voltage regulator system for use in selectively regulating a voltage source at a first output voltage potential and a second output voltage potential, said voltage regulator system comprising:
    reference means for receiving a voltage reference input signal that is representative of a request for an output reference voltage signal to change from the first output voltage potential to the second output voltage potential, and for receiving an output reference voltage at each of a plurality of comparators;
    switch means for receiving outputs of said comparators and for providing that a switch coupling the voltage reference input signal to an output capacitor is opened in the event that a significant positive difference exists between the voltage reference input signal and the output reference voltage, and in the event that a significant negative difference exists between the voltage reference input signal and the output reference voltage; and
    current source means for providing one of a positive or negative current source to an output node at which the output reference voltage is provided.

8. The voltage regulator system as claimed in claim 7, wherein said comparators of said reference means receive said output reference voltage via tolerance units.

9. The voltage regulator system as claimed in claim 7, wherein said switch means includes an OR gate.

10. The voltage regulator system as claimed in claim 9, wherein said OR gate is an inverting OR gate.

11. The voltage regulator system as claimed in claim 7, wherein said current source means provides one of the positive or negative current source to the output capacitor.

12. A voltage regulator system for use in selectively regulating a voltage source at a first output voltage potential and a second output voltage potential, said voltage regulator system comprising:
    reference means for receiving a voltage reference input signal that is representative of a request for an output reference voltage signal to change from the first output voltage potential to the second output voltage potential, and for receiving an output reference voltage at each of a plurality of comparators;
    switch means for receiving outputs of said comparators and for providing that a switch coupling the voltage reference input signal to an output capacitor is opened to isolate the voltage reference input signal from the output capacitor in the event that a significant positive difference exists between the voltage reference input signal and the output reference voltage, and in the event that a significant negative difference exists between the voltage reference input signal and the output reference voltage; and
    current source means for providing one of a positive or negative current source to the output capacitor and an output node at which the output reference voltage is provided responsive to outputs of the comparators of the reference means while the switch remains opened isolating the voltage reference input signal from the output capacitor.

13. The voltage regulator system as claimed in claim 12, wherein said comparators of said reference means receive said output reference voltage via tolerance units.

14. The voltage regulator system as claimed in 12, wherein said switch means includes an OR gate.

15. The voltage regulator system as claimed in claim 14, wherein said OR gate is an inverting OR gate.

16. The voltage regulator system as claimed in claim 12, wherein said current source means includes a positive current source switch that is coupled to a first comparator of said reference means.

17. The voltage regulator system as claimed in claim 12, wherein said current source means includes a negative current source switch that is coupled to a second comparator of said reference means.

* * * * *